US012672224B2

(12) United States Patent
Warren et al.

(10) Patent No.: US 12,672,224 B2
(45) Date of Patent: Jun. 30, 2026

(54) DYNAMIC CONFIGURATION AND CONTROL OF A SPEAKER-LIGHT ARRAY

(71) Applicant: Zuma Array LLC, San Francisco, CA (US)

(72) Inventors: Morten Villiers Warren, London (GB); Edward Thomas Rose, London (GB); John Moore, London (GB); Thomas Kleist, London (GB); John Daniell Hebert, London (GB); Fong Ming, London (GB)

(73) Assignee: Zuma Array Ltd., London (GB)

( * ) Notice: Subject to any disclaimer, the term of this patent is extended or adjusted under 35 U.S.C. 154(b) by 284 days.

(21) Appl. No.: 18/560,379

(22) PCT Filed: May 12, 2022

(86) PCT No.: PCT/US2022/288870

§ 371 (c)(1),
(2) Date: Nov. 11, 2023

(87) PCT Pub. No.: WO2022/241061

PCT Pub. Date: Nov. 17, 2022

(65) Prior Publication Data

US 2025/0133644 A1 Apr. 24, 2025

Related U.S. Application Data

(60) Provisional application No. 63/187,849, filed on May 12, 2021.

(51) Int. Cl.
*H05B 47/19* (2020.01)
*F21V 23/02* (2006.01)
(Continued)

(52) U.S. Cl.
CPC ............ *H05B 47/19* (2020.01); *F21V 23/02* (2013.01); *F21V 23/04* (2013.01);
(Continued)

(58) Field of Classification Search
CPC ......... G10L 15/08; G10L 15/22; G10L 13/02; G10L 15/25; G10L 2015/223;
(Continued)

(56) References Cited

U.S. PATENT DOCUMENTS 7,997,772 B2 * 8/2011 Avtzon .................... F21S 6/001 362/161
2013/0163787 A1 * 6/2013 Moon ........................ H03F 3/68 381/120
(Continued)

OTHER PUBLICATIONS

PCT Patent Appl. Serial No. PCT/US2022/288870, International Search Report and Written Opinion, Oct. 5, 2022.
(Continued)

*Primary Examiner* — Monica C King
(74) *Attorney, Agent, or Firm* — Steven Stupp

(57) ABSTRACT

A system that selectively provides power to a speaker light is described. This system may include: the speaker light; a power supply that provides electrical power to the speaker light when the power supply is electrically coupled to an external power source; a relay electrically coupled to the power supply and electrically coupled to a switch; and the switch, where the switch has a first state in which the switch electrically couples the relay to the external power source and a second state in which the switch electrically decouples the relay from the external power source. Moreover, the speaker light may include a master speaker light in a speaker-light array with multiple speaker lights and associated power supplies, and the master speaker light may
(Continued)

wirelessly configure and control operation of one or more remaining speaker lights in the speaker-light array.

20 Claims, 17 Drawing Sheets

(51) Int. Cl.

| | |
|---|---|
| ***F21V 23/04*** | (2006.01) |
| ***F21V 33/00*** | (2006.01) |
| ***H04R 1/02*** | (2006.01) |
| ***H05B 47/175*** | (2020.01) |

(52) U.S. Cl.

CPC ......... *F21V 33/0056* (2013.01); *H04R 1/028* (2013.01); *H05B 47/197* (2024.01); *H04R 2420/07* (2013.01)

(58) Field of Classification Search

CPC ... G10L 2015/088; G10L 15/20; G10L 17/10; G10L 13/00; G10L 13/027; G10L 15/16; G10L 17/02; G10L 17/04; G10L 17/18; G10L 25/84; G10L 15/1822; G10L 21/0208; G10L 17/00; G10L 2015/225; G10L 15/30; G10L 21/06; G10L 25/51; G10L 25/21; G10L 25/48; G10L 17/06; G10L 25/63; G10L 15/24; G10L 15/26; G10L 15/32; G10L 17/22; G10L 2021/02082; G10L 21/0232

See application file for complete search history.

(56) References Cited

U.S. PATENT DOCUMENTS

| | | | |
|---|---|---|---|
| 2015/0022620 | A1 | 1/2015 | Siminoff |
| 2015/0266665 | A1 | 9/2015 | Pera et al. |
| 2015/0296599 | A1 | 10/2015 | Recker et al. |
| 2016/0309246 | A1 | 10/2016 | O'Keeffe |
| 2019/0141447 | A1 | 5/2019 | Dunn et al. |
| 2020/0136369 | A1 | 4/2020 | Chauhan et al. |

OTHER PUBLICATIONS

"International Search Report and Written Opinion of the International Searching Authority", International Application No. PCT/US2022/0288870, Oct. 5, 2022, 9 pp.

* cited by examiner

FIG. 6
WELLBEING HOME
ZUMA
Wellbeing
Combine light and sound experiences to enhance your daily rituals and tasks.
Inner peace
Energize
Concentrate
Meditation
Morning ritual
Sound healing
Home
Radio
Moods
Settings
SELECT WELLBEING CHANNEL
SELECT WELLBEING MENU

CLOSE
DRAWER

SELECT
SOUND
TAB

AREA SCREEN
WELLBEING TAB
ACTIVE TILE

AREA SCREEN
AUDIO TAB – WELLBEING
ACTIVE

SELECT
LIGHT
TAB

AREA SCREEN
LIGHT TAB – WELLBEING
ACTIVE

DYNAMIC CONFIGURATION AND CONTROL OF A SPEAKER-LIGHT ARRAY

CROSS-REFERENCE TO RELATED APPLICATIONS

The present application is a 35 U.S.C. § 371 national stage application of PCT Application No. PCT/US2022/0288870, filed on May 12, 2022, which claims the benefit of U.S. Provisional Patent Application No. 63/187,849, filed on May 12, 2021, the entire contents of both of which are incorporated herein by reference.

FIELD

The described embodiments relate to dynamic configuration and/or control of a speaker-light array.

BACKGROUND

The increasing communication, sensing and processing capabilities of electronic devices is enabling automation applications, such as in residential units or homes. These automation applications are sometimes referred to as a 'smart home' or a 'smart house.' In a smart home, electronic devices monitor and/or control home attributes, such as lighting, climate, entertainment systems and/or appliances.

However, it is typically difficult to integrated electronic devices in a smart home. In addition, it is often difficult to control or to configure the electronic devices in a smart home.

SUMMARY

In a first group of embodiments, an electronic device that provides information specifying at least a portion of a configuration is described. This electronic device includes: a user-interface device, an interface circuit, memory storing program instructions, and a processor that executes the program instructions. During operation, the electronic device receives information specifying user-interface activity associated with a user. Then, the electronic device determines a configuration of one or more speaker lights in an array based at least in part on the user-interface activity. Note that, in general, the configuration may include light and/or sound output (or not) by one or more of the speaker lights in the array. Next, the electronic device provides, addressed to at least a speaker light in the array (such as a master speaker light in the array), second information specifying at least the portion of the configuration. For example, at least the portion of the configuration may include one or more changes in an existing configuration of a second speaker light (which may be the same as or different from the speaker light) in the array. Thus, in some embodiments, the configuration of the second speaker light is updated differentially.

Additional embodiments provide a user interface, which may be displayed on a display of or associated with the electronic device.

Another embodiment provides a computer in a computer system that performs at least some of the aforementioned operations and/or or counterpart operations in one or more of the preceding embodiments.

Another embodiment provides a computer-readable storage medium with program instructions for use with the electronic device, the computer or the computer system. When executed by the electronic device, the computer or the computer system, the program instructions cause the electronic device, the computer or the computer system to perform at least some of the aforementioned operations and/or counterpart operations in one or more of the preceding embodiments.

Another embodiment provides a method, which may be performed by the electronic device, the computer or the computer system. This method includes at least some of the aforementioned operations and/or counterpart operations in one or more of the preceding embodiments.

In a second group of embodiments, a system that selectively provides power to a speaker light is described. This system includes: the speaker light; a power supply, electrically coupled to the speaker light, that provides electrical power to the speaker light when the power supply is electrically coupled to an external power source (such as utility power); an optional relay electrically coupled to the power supply and electrically coupled to a switch; and the switch, where the switch has a first state in which the switch electrically couples the optional relay to the external power source and a second state in which the switch electrically decouples the optional relay from the external power source.

Note that the switch may include a toggle switch, such as a light switch.

Moreover, the speaker light may include a master speaker light in a speaker-light array with multiple speaker lights (including the speaker light) and associated power supplies, and the master speaker light may configure and control operation of one or more remaining speaker lights in the speaker-light array using wireless communication. Alternatively, each of the power supplies may be electrically coupled to the optional relay.

Furthermore, the speaker lights are electrically coupled in parallel with the optional relay.

Additionally, the speaker light may transition to a first operating state when the switch is in the first state and may transition to a second operating state when the switch is in the second state, where a power consumption of the speaker light in the first operating state is less than a power consumption of the speaker light in the second operating state.

In some embodiments, a transition time from the first operating state to the second operating stated is based at least in part on a predefined configuration of the speaker light. For example, the transition time may be specified in the predefined configuration.

Moreover, the speaker light may be electrically coupled to the optional relay using a dongle that is electrically coupled to a port in the speaker light. The dongle may provide compatibility with a communication protocol that is otherwise not supported by the speaker light. For example, the communication protocol may be compatible with an Institute of Electrical and Electronics Engineers (IEEE) 802.3 communication protocol or a Message Queueing Telemetry Transport (MQTT) communication protocol. Note that the dongle may be electrically coupled to a universal serial (USB) port in the speaker light. Furthermore, pins in the USB port may be used for different functions than UCB communication.

In some embodiments, the dongle may be electrically coupled to both electrical connections of the switch. The dongle may pull one of the electrical connections up to a first logic level or down to a second logic level. For example, the dongle may include a set-up/step-down converter that compensates for a voltage drop between the switch and the dongle. Moreover, when the switch is transitioned from the first state to the second state, a state of the one of the electrical connections may be inverted. Based at least in part on the inversion, the dongle may provide a message (such as via a serial command) to the speaker light to transition from the second operating state to the first operating state.

Furthermore, in some embodiments, the switch may have more than the first state and the second state. For example, the switch may have a continuous-valued state, which includes the first state and the second state.

Another embodiment provides the speaker light.

Another embodiment provides the dongle.

Another embodiment provides a computer-readable storage medium with program instructions for use with the dongle or the speaker light. When executed by the dongle or the speaker light, the program instructions cause the dongle or the speaker light to perform at least some of the aforementioned operations in one or more of the preceding embodiments.

Another embodiment provides a method, which may be performed by the dongle or the speaker light. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

DRAWINGS

Note that like reference numerals refer to corresponding parts throughout the drawings. Moreover, multiple instances of the same part are designated by a common prefix separated from an instance number by a dash.

DETAILED DESCRIPTION

Figure 1:
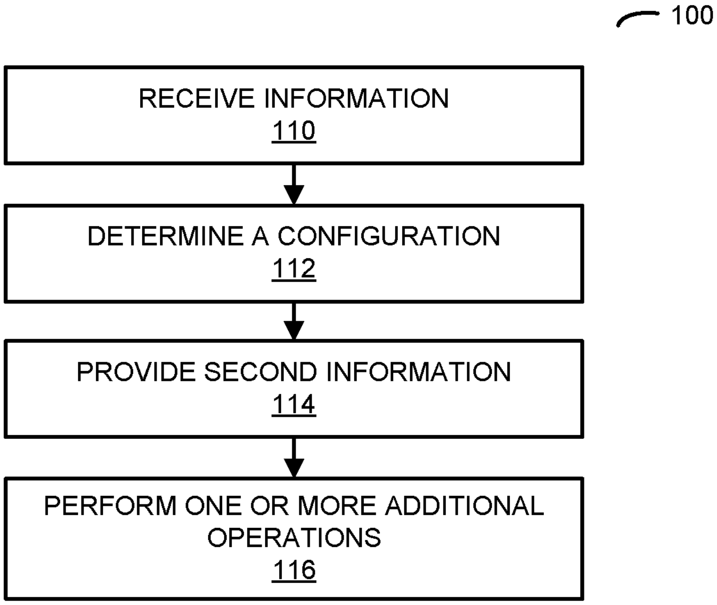
FIG. 1 is a flow diagram illustrating an example of a method for adjusting or configuring one or more speaker lights using an electronic device in FIG. 1 in accordance with an embodiment of the present disclosure.

In a first group of embodiments, an electronic device that provides information specifying at least a portion of a configuration is described. During operation, the electronic device may receive information specifying user-interface activity associated with a user. Then, the electronic device may determine a configuration of one or more speaker lights in an array based at least in part on the user-interface activity. Note that, in general, the configuration may include light and/or sound output (or not) by one or more of the speaker lights in the array. Next, the electronic device may provide, addressed to at least a speaker light in the array (such as a master speaker light in the array), second information specifying at least the portion of the configuration.

By determining the configuration and providing at least the portion of the configuration, these configuration techniques may facilitate intuitive and dynamic configuration of the one or more speaker lights. Moreover, the configuration techniques may facilitate the integration of the one or more speaker lights (such as a speaker-light array) into a smart home. Consequently, the configuration techniques may reduce the time and effort needed to configure the one or more speaker lights and, thus, may improve the user experience when using the electronic device and/or the one or more speaker lights.

In a second group of embodiments, a system that selectively provides power to a speaker light is described. This system may include: the speaker light; a power supply, electrically coupled to the speaker light, that provides electrical power to the speaker light when the power supply is electrically coupled to an external power source (such as utility power); a relay electrically coupled to the power supply and electrically coupled to a switch (such as a toggle switch or a light switch); and the switch, where the switch has a first state in which the switch electrically couples the relay to the external power source and a second state in which the switch electrically decouples the relay from the external power source. Moreover, the speaker light may include a master speaker light in a speaker-light array with multiple speaker lights (including the speaker light) and associated power supplies, and the master speaker light may configure and control operation of one or more remaining speaker lights in the speaker-light array using wireless communication. Alternatively, each of the power supplies may be electrically coupled to the optional relay.

By selectively providing power to the speaker light based at least in part on the state of the switch, the configuration techniques may allow a light switch to be used to control operation of the speaker light. Moreover, because the speaker light may function as a hub in the speaker-light array, the light switch may be used to (directly or indirectly) control operation of the speaker-light array. This switching configuration may allow existing infrastructure to be used and may avoid problems associated with wireless communication (e.g., because of metallic shielding around the light switch). Consequently, the configuration techniques may improve the speaker light and/or the speaker-light array.

The described embodiments relate to a dynamic control or configuration of an array with multiple instances of electronic devices that combine speakers and lighting. Notably, a given electronic device may include a speaker driver and diaphragm with one or more lighting elements (such as one or more LEDs) in a common chassis or housing. In the discussion that follows, the given electronic device is referred to as a 'speaker light' or a 'sensor device.'

Moreover, in some embodiments, in an environment (such as a room), the speaker lights may be mounted in the ceiling. Note that the speaker lights may be capable of communicating with each other using wired and/or wireless communication, and one or more of the speaker lights may be capable of communicating with a portable electronic device (such as a cellular telephone associated with a user) using wireless communication. For example, the wireless communication may use a wireless mesh network.

In some embodiments, the wireless communication may involve one or more wireless communication protocols, such as: an IEEE 802.11 standard (which is sometimes referred to as 'Wi-Fi,' from the Wi-Fi Alliance of Austin, Texas), Bluetooth (from the Bluetooth Special Interest Group of Kirkland, Washington), BLE (from the Bluetooth Special Interest Group of Kirkland, Washington), Zigbee (from the Zigbee Alliance of Davis, California), Z-Wave (from Sigma Designs, Inc. of Fremont, California), LoRaWAN (from the Lora Alliance of Beaverton, Oregon), Thread (from the Thread Group of San Ramon, California), IPv6 over low-power wireless personal area networks or 6LoWPAN (from the Internet Engineering Taskforce of Fremont, California) and/or another type of wireless interface. In the discussion that follows, Wi-Fi is used as an illustrative example. Note that an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. The wireless communication may occur in one or more bands of frequencies, such as: a 900 MHZ, a 2.4 GHz, a 5 GHz, 6 GHz, the Citizens Broadband Radio Spectrum or CBRS (e.g., a frequency band near 3.5 GHZ), 60 GHZ, and/or another band of frequencies. For example, in some embodiments, the wireless communication may use Kleer wireless technology or KleerNet™ (from Microchip Technology, Inc. of Chandler, Arizona). In some embodiments, communication between speaker lights may use multi-user transmission (such as orthogonal frequency division multiple access or OFDMA).

The wired communication may involve one or more wired communication protocols, such as: an IEEE 802.3 standard (which is sometimes referred to as 'Ethernet'), MQTT and/or another type of wired interface. In the discussion that follows, Ethernet is used as an illustrative example.

Furthermore, a given speaker light may be adaptively configured with one or more types of non-invasive sensors, such as: an imaging sensor, a microphone, a pressure sensor, a temperature sensor, a humidity sensor, a smoke detector, a carbon-monoxide detector, an infrared detector, a heat sensor, a motion sensor, a time-of-flight sensor, a radar sensor, a location sensor, and/or another type of sensor. For example, the given speaker light may be configured using a front plate or bezel that includes one or more sensors and a speaker grill, and which is remateably and electrically coupled to the given speaker light (such as via magnets and electrical contacts or leaf springs, respectively). By changing the front plate or bezel, the capabilities of the given speaker light may be modified or adapted as needed. Note that light and/or sound may pass through the bezel, e.g., via one or more openings or a grille.

Additionally, in some embodiments, at least one of the speaker lights in a speaker-light array may be designated as a master speaker light, which coordinates control of and/or communication with the remaining speaker lights in the array. Note that the speaker lights in the speaker-light array may self-configure to identify or select the master speaker light. For example, the master speaker light may be the speaker light that has the best communication performance, such as a best value of: a received signal strength or RSSI, a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). Alternatively, a user may select or specify the master speaker light (e.g., using a user interface on a portable electronic device that communicates with one or more of the speaker lights). In some embodiments, inter-sensory-device communication is used to synchronize clocks or clock domains in the speaker lights in the array with a synchronization accuracy that is less than a predefined value, e.g., 1 or 5 μs.

Note that the speaker lights may perform measurements that, at least in part, characterize the environment (e.g., of light intensity, sound amplitude and/or phase at one or more frequencies in an acoustic band of frequencies, such as between 50-20,000 Hz, early or first reflections, a reverberation time, absorption, etc.). Then, these measurements may be exchanged or shared, e.g., with the master speaker light, which may use the measurements to automatically calibration and configure or adapt the light and/or the sound of one or more of the speaker lights in the environment. For example, the master speaker light may change the light intensity, direction and/or color temperature, and/or may change a direction of the sound, the balance, noise cancellation, room or sound-field shaping and/or a real or complex equalization of at least a portion of the acoustic band of frequencies (such as boosting the bass). In some embodiments, the calibration and configuration are performed by multiple speaker lights in a distributed manner.

Moreover, the portable electronic device (such as a cellular telephone) may execute a sensory application that is used by a user to control and configure the speaker-light array. For example, the sensory application may be installed on the portable electronic device and may execute in an environment of the portable electronic device (such as the operating system). When executing on the portable electronic device, the speaker light may provide a user interface that is displayed on the portable electronic device. Then, as the user interacts with the user interface (e.g., using a keyboard, a mouse, a trackpad, a stylus, another type of human-interface device, a non-contact haptic interface, a voice interface, etc.), information specifying user-interface activity (such as one or more selections or changes to the user interface, e.g., a state or a configuration of one or more of the speaker lights) may be received by the portable electronic device. Next, the portable electronic device may provide (e.g., via wireless communication) control and/or configuration information to one or more of the speaker lights based at least in part on the user-interface activity. Alternatively, the sensory application may be executed remotely on a local or a cloud-based computer that provides instructions for the user interface to the portable electronic device, and then receives from the portable electronic device information specifying the user-interface activity. Furthermore, the computer may provide (e.g., via wired or wireless communication) control and/or configuration information to one or more of the speaker lights based at least in part on the user-interface activity. Note that the user interface may allow the user to control and/or configure the speaker-light array. This ease of use may simplify and improve the onboarding experience, thereby allowing the user to rapidly configure and use the speaker lights.

For example, the user interface may include information (such as settings for one or more physical buttons and/or virtual icons) specifying whether a given speaker light outputs a left or right audio channel in stereo sound. Thus, the user may manually change whether the given speaker light outputs the left or the right channel. By adjusting these settings for one or more speaker lights in the environment, the user may change the balance of the sound output by the speaker lights. Alternatively or additionally, the user interface may include information specifying the sound output by the given speaker light, such as: mono, multi-channel audio and/or surround sound, and the user may interact with the user interface to change the acoustic configuration of one or more of the speaker lights. In general, the user interface may include a variety of types of user-interface objects or features, such as: sliders, check boxes, radio buttons, pull-down menus, virtual icons, etc.

Furthermore, the user interface may include information specifying predefined combinations of light and/or sound configurations. These predefined combinations may correspond to or may evoke different cognitive, moods or emotional states of a user in the environment. For example, the user interface may include a well-being physical button or virtual icon. When activated (such as when the user touches a display within a strike area of the virtual icon and then breaks contact with the display), the resulting user-interface activity information may be communicated to the master speaker light, which then accordingly adjusts the lighting to be diffuse and/or the sound provided by the speaker lights to be binaural. In some embodiments, the sound may include ambient sound, which in conjunction with bright light directed at an electronic display in the environment may promote concentration by the user. Note that the predefined combinations may: correspond to or address a medical condition of the user (such as dementia) or an age of the user (such as for an elderly user); promote sleep or rest (such as low or no lighting with soft white noise); and/or adjust a circadian rhythm of the user (such as by using artificial sunrise and sunset timing, a brightness, a color temperature, etc.). More generally, the predefined combinations may evoke or provide a rich emotional palette of moods or emotional states in a user, such as: savanna, jungle, spiritual, etc. Moreover, in embodiments where the user interacts with the user interface and/or the speaker-light array using a verbal interface, the user may control and configure the speaker lights using an emotional language.

Thus, the predefined combinations may promote improved health or well-being of the user. In some embodiments, the predefined combinations may be based at least in part on user preferences and/or may be dynamically learned by one or more of the speaker lights (such as the master speaker light) based at least in part on a history of user selections and/or activity when using the speaker lights (such as the type of music and/or lighting at different times or the day, days of the week, etc.). In some embodiments, the user may, via the user interface, obtain and install in the application one or more additional predefined combinations (e.g., from a third-party supplier) for use with the speaker-light array.

FIG. 1 presents a flow diagram illustrating an example of a method 100 for adjusting or configuring one or more speaker lights, which may be performed by an electronic device (such as a portable electronic device). During operation, the electronic device may receive information (operation 110) specifying user-interface activity associated with a user. Then, the electronic device may determine a configuration (operation 112) of one or more speaker lights in the array based at least in part on the user-interface activity. Note that, in general, the configuration may include light and/or sound output (or not) by one or more of the speaker lights in the array. Next, the electronic device may provide, addressed to at least a speaker light in the array (such as a master speaker light in the array), second information (operation 114) specifying at least a portion of the configuration. For example, at least the portion of the configuration may include one or more changes in an existing configuration of a second speaker light (which may be the same as or different from the speaker light) in the array. Thus, in some embodiments, the configuration of the second speaker light is updated differentially.

In some embodiments, the electronic device may optionally perform one or more additional operations (operation 116).

In some embodiments of method 100, there may be additional or fewer operations. Furthermore, the order of the operations may be changed, and/or two or more operations may be combined into a single operation.

Figure 2:
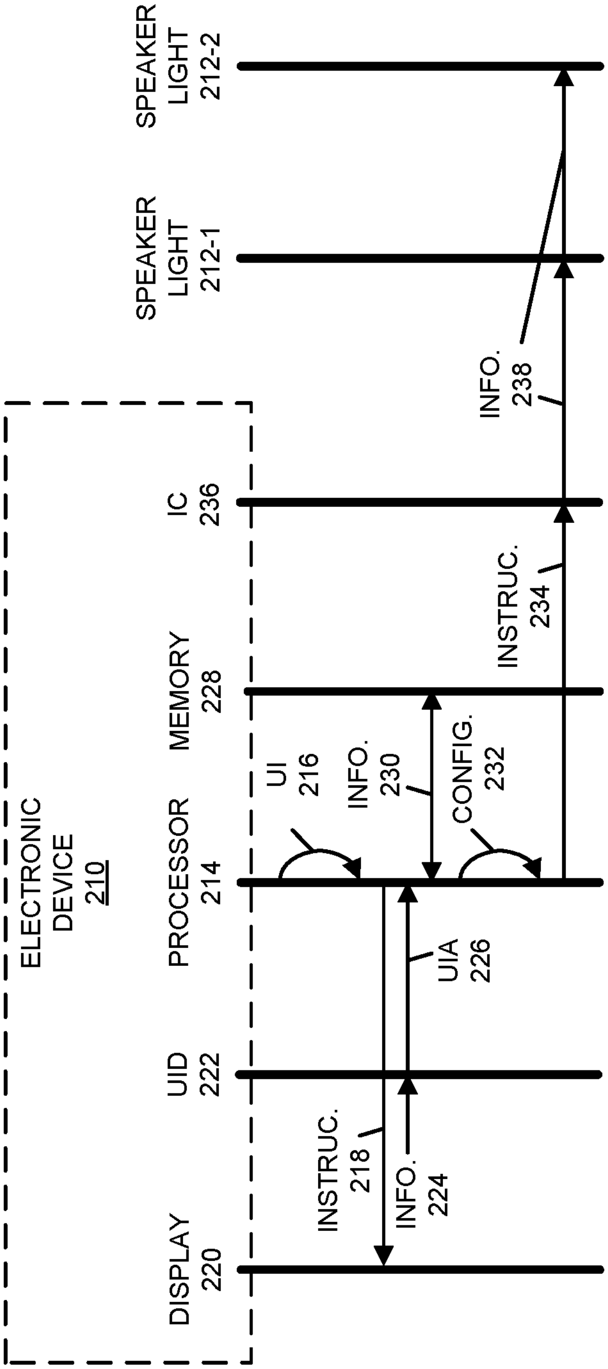
FIG. 2 is a drawing illustrating an example of communication among an electronic device and speaker lights in accordance with an embodiment of the present disclosure.

Embodiments of the configuration techniques are further illustrated in FIG. 2, which presents a drawing illustrating an example of communication among electronic device 210, speaker light 212-1 and speaker light 212-2. Notably, a processor 214 in electronic device 210 may provide instructions 218 for a user interface (UI) 216 to a display 220 in electronic device 210, which displays user interface 216.

Then, a user-interface device (UID) 222 in electronic device 210 may receive information 224 specifying user-interface activity (UIA) 226 associated with a user of user interface 216. User-interface device 222 may provide user-interface activity 226 to processor 214. Based at least in part on user-interface activity 226 and optionally stored information 230 in memory 228 in electronic device 210, processor 214 may determine a configuration 232 of one or more of speaker lights 212.

Next, processor 214 may provide instructions 234 to interface circuit 236 in electronic device 210 to provide, addressed to at least speaker light 212-1, information 238 specifying at least a portion of configuration 232. For example, at least the portion of configuration 232 may include one or more changes in an existing configuration of speaker light 212-2. Consequently, after receiving information 238, an interface circuit in speaker light 212-1 may provide information 238 to speaker light 212-2, which may implement the one or more changes, such as changing light and/or sound output by speaker light 212-2.

While FIG. 2 illustrates communication between electronic devices and components using unidirectional or bidirectional communication with lines having single arrows or double arrows, in general the communication in a given operation in this figure may involve unidirectional or bidirectional communication. Moreover, while FIG. 2 illustrates operations being performed sequentially or at different times, in other embodiments at least some of these operations may, at least in part, be performed concurrently or in parallel.

Figure 3:
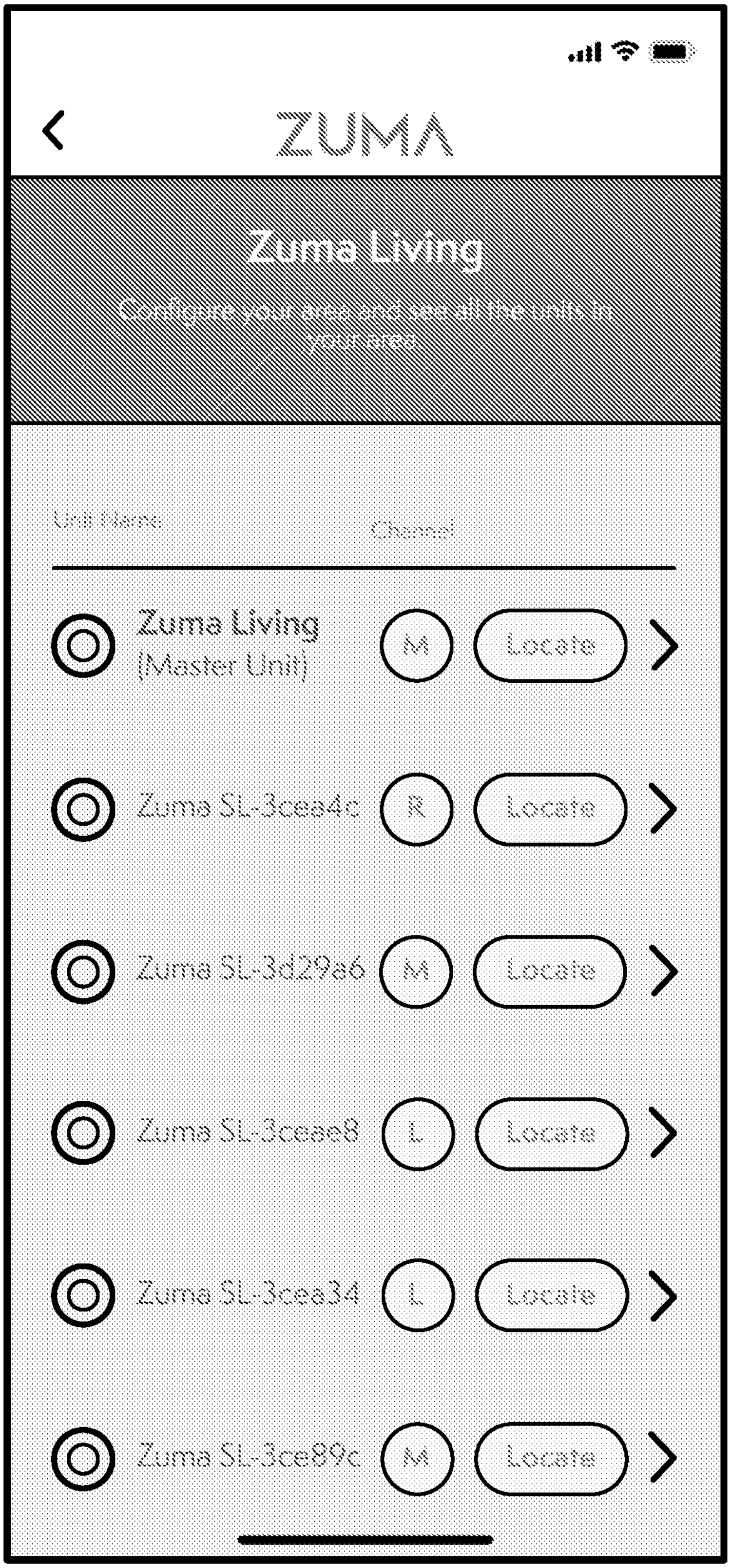
FIG. 3 is a drawing illustrating an example of a user interface in accordance with an embodiment of the present disclosure.

FIG. 3 illustrates an example of a user interface with user-interface icons that allow a user to swap audio channels in speakers in speaker-light array. Notably, when using the application, when a user accesses or taps into a given zone, the user interface may present the speaker lights in the given zone. The user interface may include a channel state (such as left, right or mono) adjacent to a given speaker light. The user may change the channel state in real-time (and, thus, the channel output by the given speaker light) by activating the channel-state virtual icon (such as by touching a touch-sensitive display within a strike area of the change-state virtual icon and then breaking contact with the touch-sensitive display), and the user may scroll through multiple channel-state options by activating the channel-state virtual icon two or more times. These capabilities may allow the user to quickly reconfigure the orientation of the sound output by some or all of the speaker lights in the environment (such as a room). In some embodiments, the user interface may be used to configure acoustic attributes or characteristics of a given speaker light that are broader than left, right or mono channel. For example, the user interface may be used to specify or modify an equalization profile for the given speaker light (which may include: a gain adjustment, a frequency adjustment, and/or digital signal processing (DSP) for timing/phase adjustments) and/or a volume setting. Depending on a location of the given speaker light, the specified equalization profile and/or volume setting may be used to deliver different room effects or acoustic improvements.

Note that in some embodiments one or more channel configurations of the speaker lights in the array may be stored, which may allow the user to select from different predefined channel configurations of multiple speaker lights using the user interface. More generally, one or more predefined equalizer profiles and/or volume settings of one or more speaker lights in the array that are defined by the user using the user interface may be stored, which may allow the user to select from different predefined equalization profiles and/or volume settings of multiple speaker lights using the user interface.

Moreover, the user interface may include a locate virtual icon adjacent to the given speaker light. When the user activates the locate virtual icon (such as by touching a touch-sensitive display within a strike area of the locate virtual icon and then breaking contact with the touch-sensitive display), a locate light may blink or illuminate on the given speaker light. These capabilities may assist the user in determining where the given speaker light is physically located in the environment. In some embodiments, the user may use an image sensor (such as a camera, a CCD sensor or a CMOS sensor in the portable electronic device) to acquire one or more images of the environment with the given speaker light that has the blinking locate light. Then, the application may analyze the one or more images (on the portable electronic device and/or via a cloud-based computer) using a computer-vision technique or a pretrained supervised-learning model (such as a neural network) to determine the location of the given speaker light with the blinking locate light. Next, the application may automatically compute (on the portable electronic device and/or via a cloud-based computer) a channel configuration for the given speaker light based at least in part on a geometry of the environment (which may be predefined or predetermined, or which may be determined from the one or more images), the location of the given speaker light, predefined or predetermined locations of one or more other speaker lights, and/or one or more measurements (such as of acoustic properties or characteristics of the environment) that were previously or currently performed (e.g., using a microphone in the portable electronic device or one or more microphones in one or more speaker lights). More generally, the application may perform (on the portable electronic device and/or via a cloud-based computer) room tuning and/or channel configuration based at least in part on the geometry of the environment, the location of the given speaker light, the predefined or predetermined locations of one or more other speaker lights, and/or the one or more measurements.

In some embodiments, once a user has defined multiple configurations (such as of channel states, volume settings and/or equalization profiles), proximity sensors (such as a camera, a radar sensor, a motion sensor, a time-of-flight sensor, or another type of sensor) in the speaker lights may be used detect current relative or absolute positions of one or more individuals in the environment. Based at least in part on this location information and the multiple predefined configurations, the master speaker light may automatically and dynamically determine a best current configuration for the speaker lights in the array. (Alternatively, a distributed approach may be used, in which a given speaker light automatically and dynamically determines its best configuration based at least in part on the current relative or absolute positions of the one or more individuals in the environment and/or configurations of the remaining speaker lights). For example, an individual may have predefined a first configuration of the speaker-light array when they are sitting at their desk, and a second configuration of the speaker-light array when they are sitting on a couch. Based at least in part on this location information, the master speaker light may automatically and dynamically switch between the first and the second configurations depending on where the individual is sitting or in which zone of speaker lights the individual is located. Note that when the master speaker light changes the current configuration of the speaker-light array, the channel state, equalization profile and/or volume setting of one or more of the speaker lights (on a sensory-device-specific basis) may be changed. In this way, the configuration techniques may dynamically provide the most-immersive and best sound experience to the one or more individuals in the environment.

Alternatively, instead of using one or more predefined configurations, in some embodiments of the configuration techniques the current configuration may be automatically and dynamically determined by, e.g., the master speaker light using one or more of the aforementioned inputs (e.g., current relative or absolute positions of one or more individuals, locations of the speaker lights, the geometry of the environment, and/or measurements of one or more acoustic characteristics) and a pretrained supervised learning model. This pretrained supervised learning model may include a classifier or a regression model that was trained using: a support vector machine technique, a classification and regression tree technique, logistic regression, LASSO, linear regression, a neural network technique (such as a convolutional neural network technique, a generative adversarial network or another type of neural network technique) and/or another linear or nonlinear supervised-learning technique.

Figure 4:
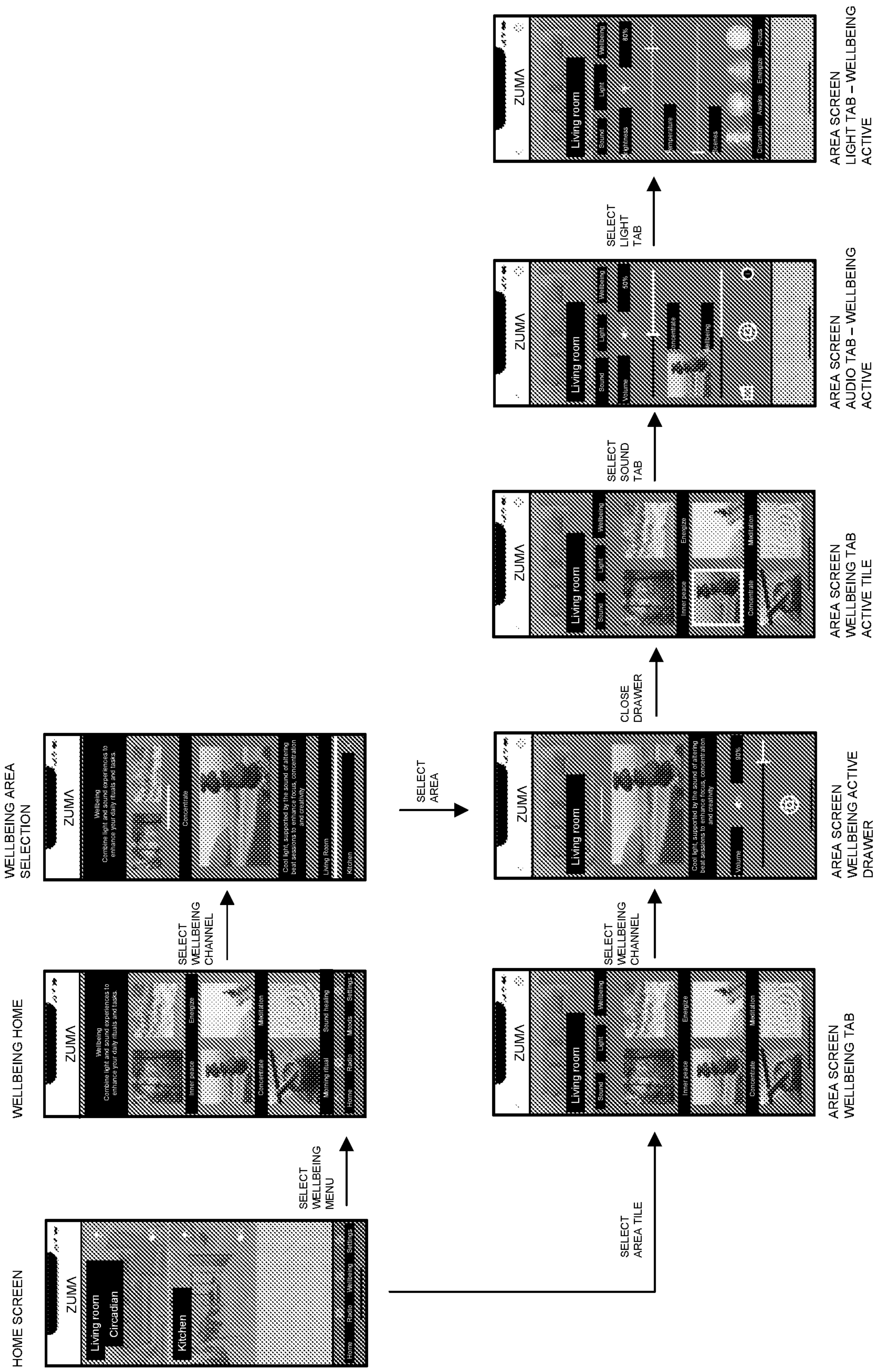
FIG. 4 is a drawing illustrating an example of a method for adjusting or configuring one or more speaker lights in an array using a user interface in accordance with an embodiment of the present disclosure.
Figure 5:
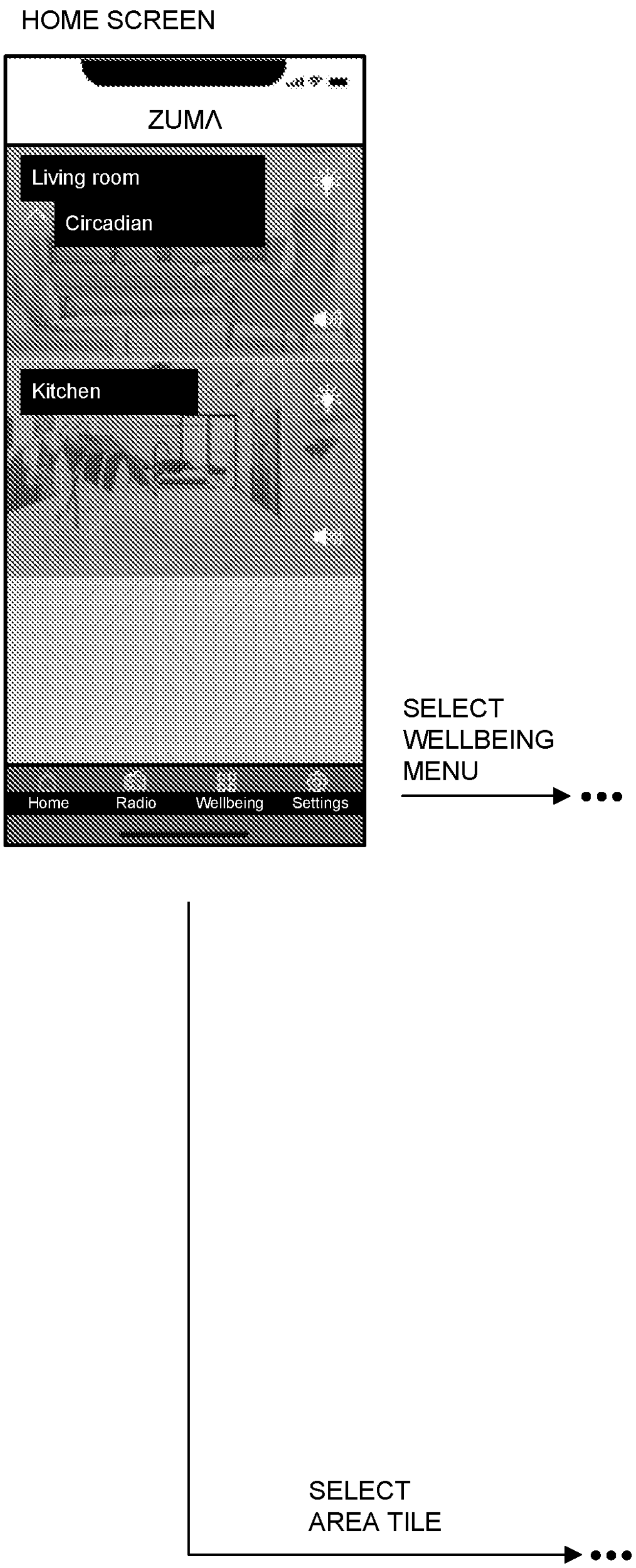
FIG. 5 is a drawing illustrating an example of a portion of the method of FIG. 4 in accordance with an embodiment of the present disclosure.
Figure 6:
FIG. 6 is a drawing illustrating an example of a portion of the method of FIG. 4 in accordance with an embodiment of the present disclosure.
Figure 7:
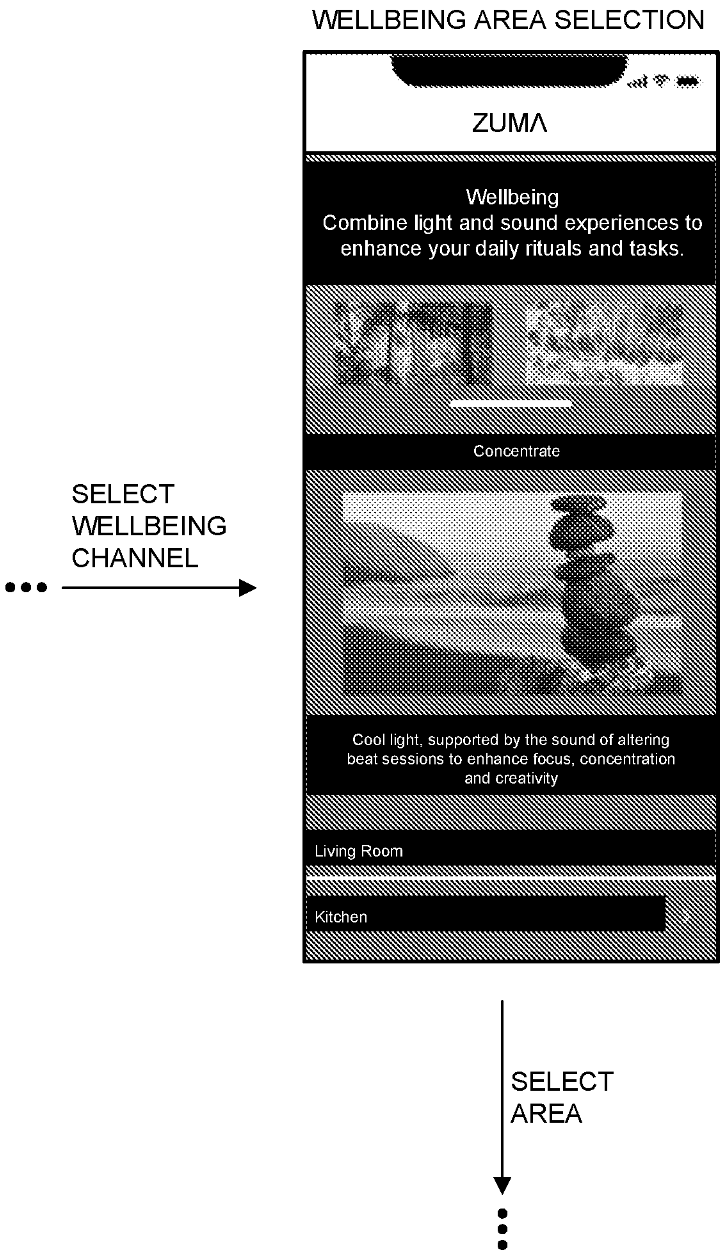
FIG. 7 is a drawing illustrating an example of a portion of the method of FIG. 4 in accordance with an embodiment of the present disclosure.
Figure 8:
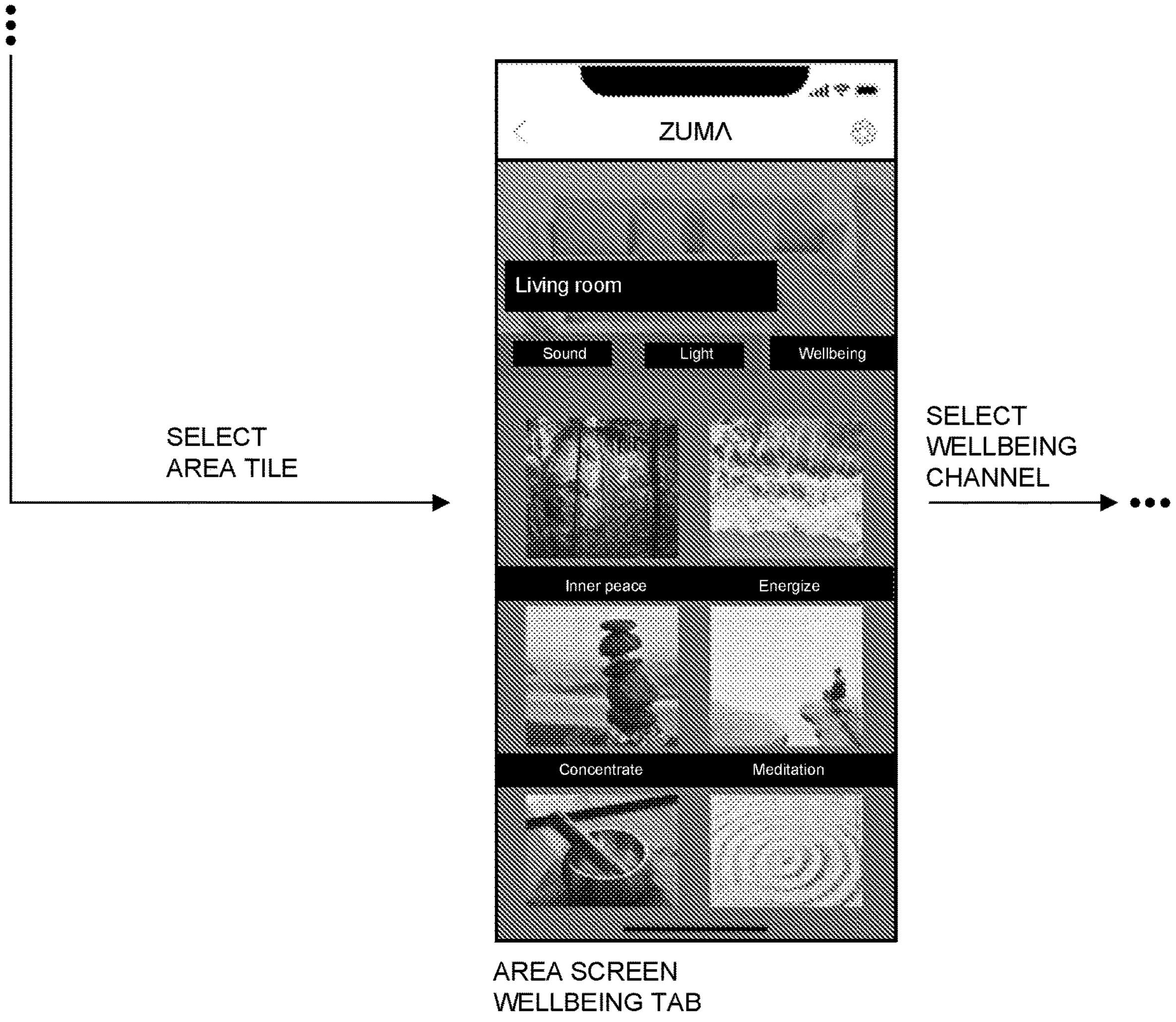
FIG. 8 is a drawing illustrating an example of a portion of the method of FIG. 4 in accordance with an embodiment of the present disclosure.
Figure 9:
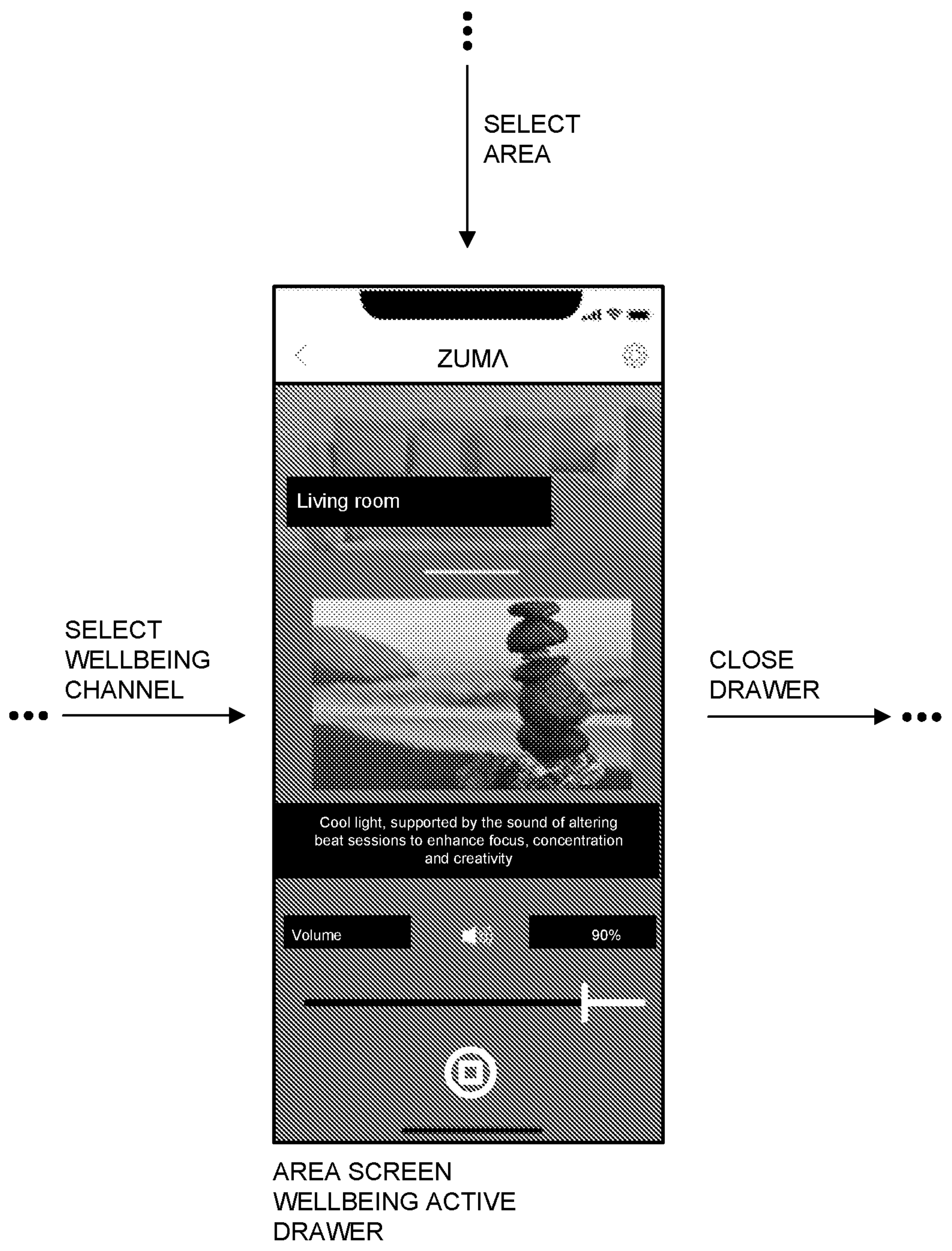
FIG. 9 is a drawing illustrating an example of a portion of the method of FIG. 4 in accordance with an embodiment of the present disclosure.
Figure 10:
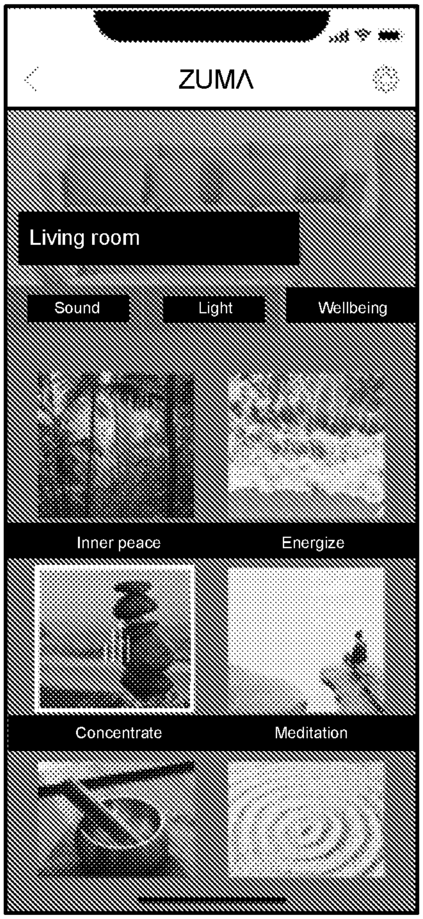
FIG. 10 is a drawing illustrating an example of a portion of the method of FIG. 4 in accordance with an embodiment of the present disclosure.
Figure 11:
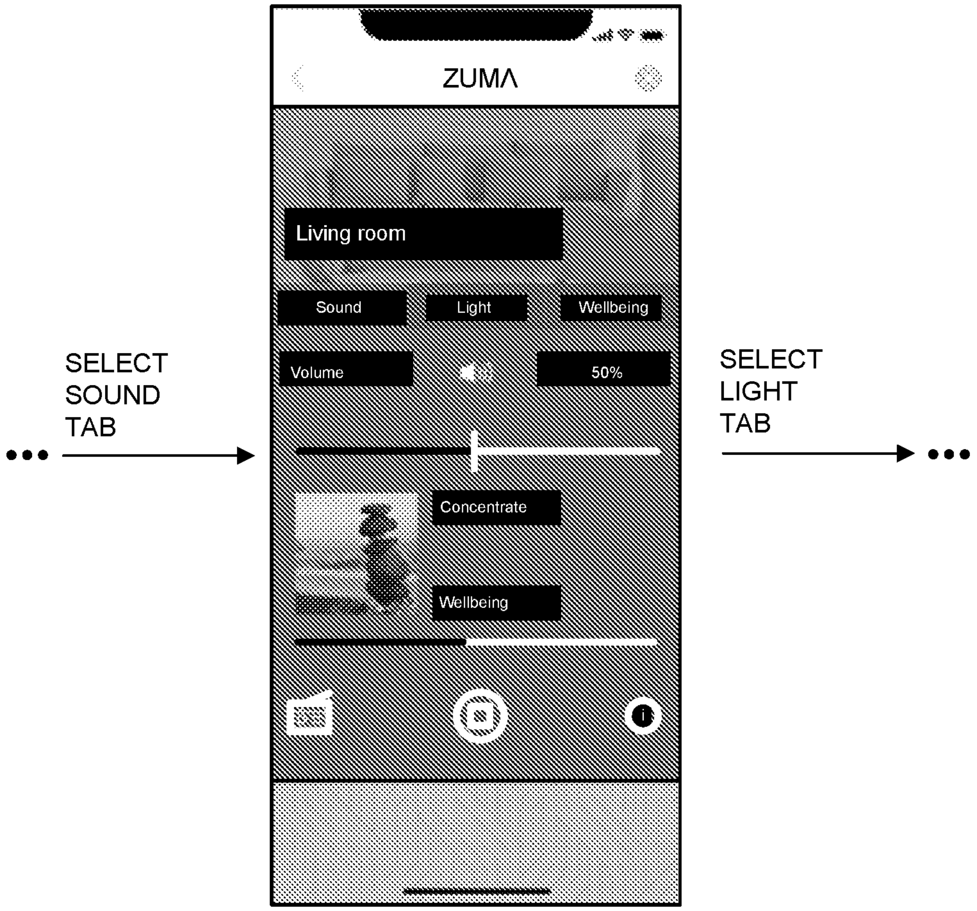
FIG. 11 is a drawing illustrating an example of a portion of the method of FIG. 4 in accordance with an embodiment of the present disclosure.
Figure 12:
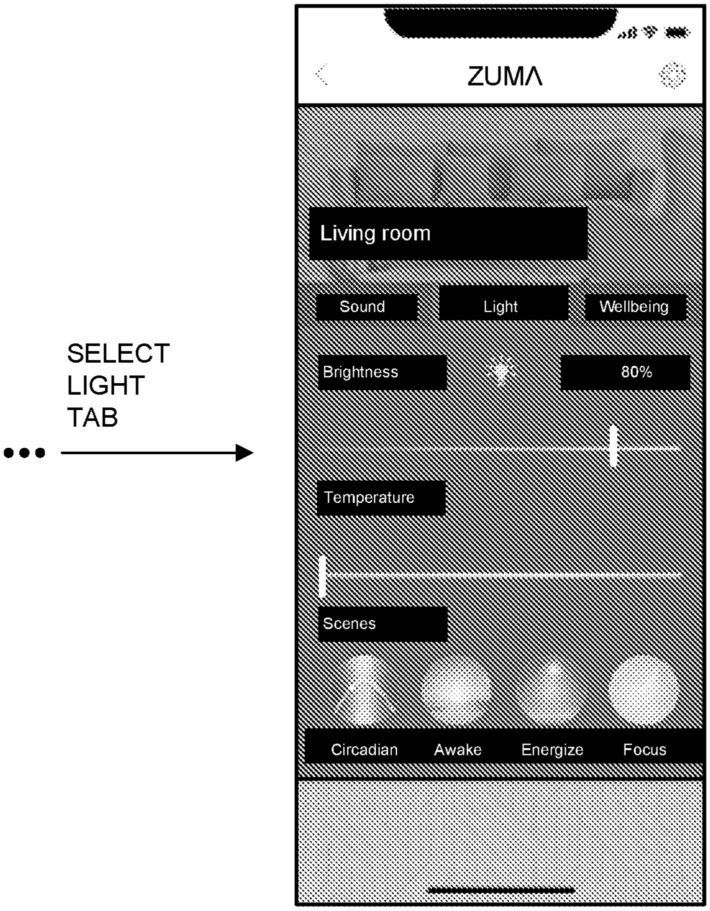
FIG. 12 is a drawing illustrating an example of a portion of the method of FIG. 4 in accordance with an embodiment of the present disclosure.

As noted previously, in some embodiments the user interface may allow a user to select from one or more predefined combinations of light and/or sound configurations (which is sometimes referred to as a 'well-being feature'). This is illustrated in FIGS. 4-12, which show a method for adjusting or configuring a speaker-light array using a user interface. Notably, FIG. 4 provides an overview of examples of operations or states in the method and different corresponding features in the user interface, and FIGS. 5-12 provide higher magnification views of examples of the user interface in the method.

The well-being feature may combine light settings and audio that in combination have a positive impact on an individual's mental and physical well-being, delivered in an immerse way by an array of speaker lights in a single zone or multiple zones in an environment. Note that in the present discussion a 'zone' may be a region with one or more speaker lights that encompasses some or all of an environment, such as one or more rooms.

Moreover, the well-being feature may be accessed in a dedicated area within the application that controls the sound and light in the speaker-light array. Alternatively or additionally, in some embodiments the well-being feature may be accessed via a third party application or a smart speaker.

Via the user interface associated with the application, a user may select a well-being channel that sets the lights to a specified intensity and temperature and starts playing a preselected audio source. At this point, the user can view additional information about the well-being channel and the associated well-being attributes.

While the preceding example illustrated the user selecting the well-being channel, in other embodiments one or more well-being channels may be triggered automatically by a scheduling system, predefined events and/or using a pretrained supervised learning model.

Note that a given well-being channel may have one or more attributes, including: a title, a description, a light temperature, an audio volume, an audio track or radio channel, customized sound (such as equalizer settings), multiple audio channel options, timed and/or synchronized changes to attributes, individual attributes for different speaker lights in the array, synchronized behaviors in different zones, progress or time remaining, schedule triggers, event triggers, predictive triggers, triggered attribute changes (which may use one or more of the aforementioned triggers to change the lighting and/or the audio), a pause capability, a skip capability, and/or another attribute.

Moreover, the light settings may use light temperatures that support desired mental and/or physical states and activities such as: focus or concentration (e.g., cool light temperatures); or relaxation or rejuvenation (e.g., warm light temperatures). In some embodiments, the light settings may remain unchanged when a well-being channel is selected. However, in other embodiments, the lighting may change over time or a duration of use of the well-being channel in order to support different activities, which are synchronized with the audio content. For example, a well-being channel may combine concentration and relaxation phases with the light changing from cool to warm in synchronization with the audio. Alternatively, in a wake-up sequence, the light and audio may fade in slowly (e.g., of 1-10 s) across the speaker lights.

Furthermore, the sound settings may use or may include one or more techniques to enhance these experiences. For example, the sound settings may include specific sound frequencies that are associated with improving well-being, such as: Solfeggio frequencies, 7-13 Hz alpha-range frequencies, and/or isochronic beats. Alternatively, the sound may include ambient sounds that mask background noises, reduce stress and provide focus, such as: rain sounds, ocean sounds, wind sound, and/or white noise. Other sounds may include: natural sounds that re-connect with nature (e.g., bird sounds or insect sounds); instructions to guide activities (e.g., meditation guidance, sleep guidance, relaxation guidance, or motivation guidance); and/or supporting music and/or sound effects (e.g., meditation chanting, energizing workout music, and/or relaxation music). Note that one or more of the preceding sounds may be used alone or in combination with one or more other sounds. In some embodiments, one or more of the preceding sounds may be blended together with additional ambient sounds or music.

Additionally, a well-being channel may play a preselected radio station using one or more of the well-being sounds, e.g., playing audio content in an endless loop or for a predefined time interval. However, in other embodiments, a user may select different radio stations or tracks/playlists from specific streaming services associated with a well-being channel. Note that the audio content may be hosted and played from within the application. Moreover, the audio content may be customized or created for a particular user. Furthermore, the well-being channels may be time-boxed, such as scheduled wake up sequences or guided meditation sessions.

Furthermore, the sounds may be played by the speaker lights in a selected speaker-light array. As noted previously, a user may assign individual channels for each speaker light in the array, choosing from mono, left or right channel settings. In some embodiments, sound may be played using directional audio that can only be experienced in certain areas or zones. Additionally, in some embodiments, sound may be played using a surround sound formats. Note that sound may be recorded with individual channels matching the different speakers in the speaker lights in the array for advanced spatial audio effects.

Additionally, the speaker lights in the array may be controlled via one or more conventional light switches in the environment (such as an on/off or toggle switch having two states). For example, a light switch may be used to turn the master speaker light 'off' (e.g., transitioning to a lower-power operating state). In existing smart home solutions, such as so-called smart lighting, a conventional light switch is often made 'smart' by electrically coupling the light switch to a relay (or another switch) that is wirelessly controlled, e.g., using Wi-Fi or Bluetooth, by a hub that controls the relay, e.g., based on a user input. However, in these approaches, when the power to a given light switch is turned off (e.g., using the relay), the given light switch is no long 'smart.' Alternatively, if a light bulb is smart, then different approaches are typically used for wirelessly communication between a hub and the light bulb. In these existing smart home solutions, the light bulb may be permanently electrically coupled to a utility power or a power socket.

Figure 13:
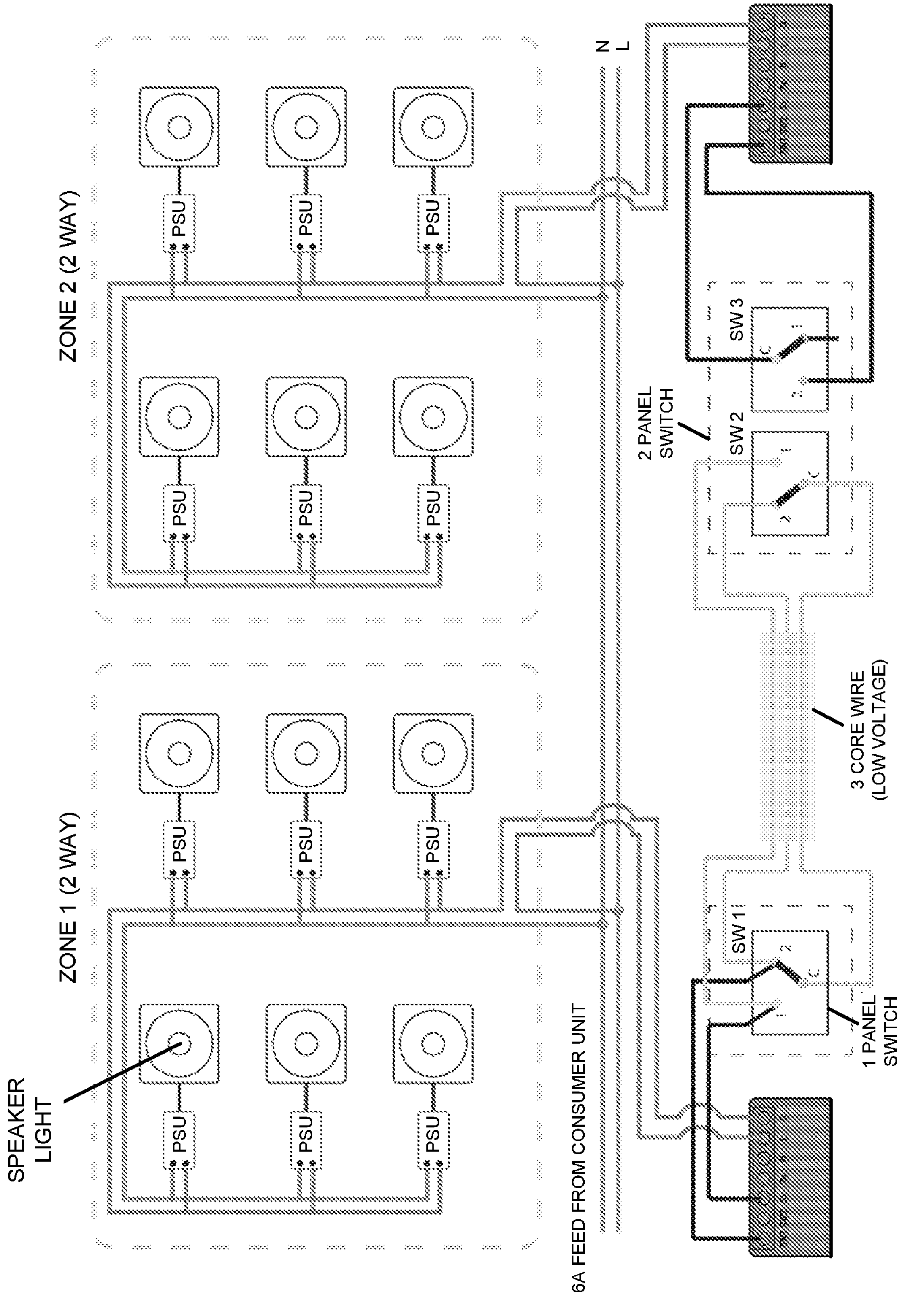
FIG. 13 is a drawing illustrating an example of a switching configuration in accordance with an embodiment of the present disclosure.
Figure 14:
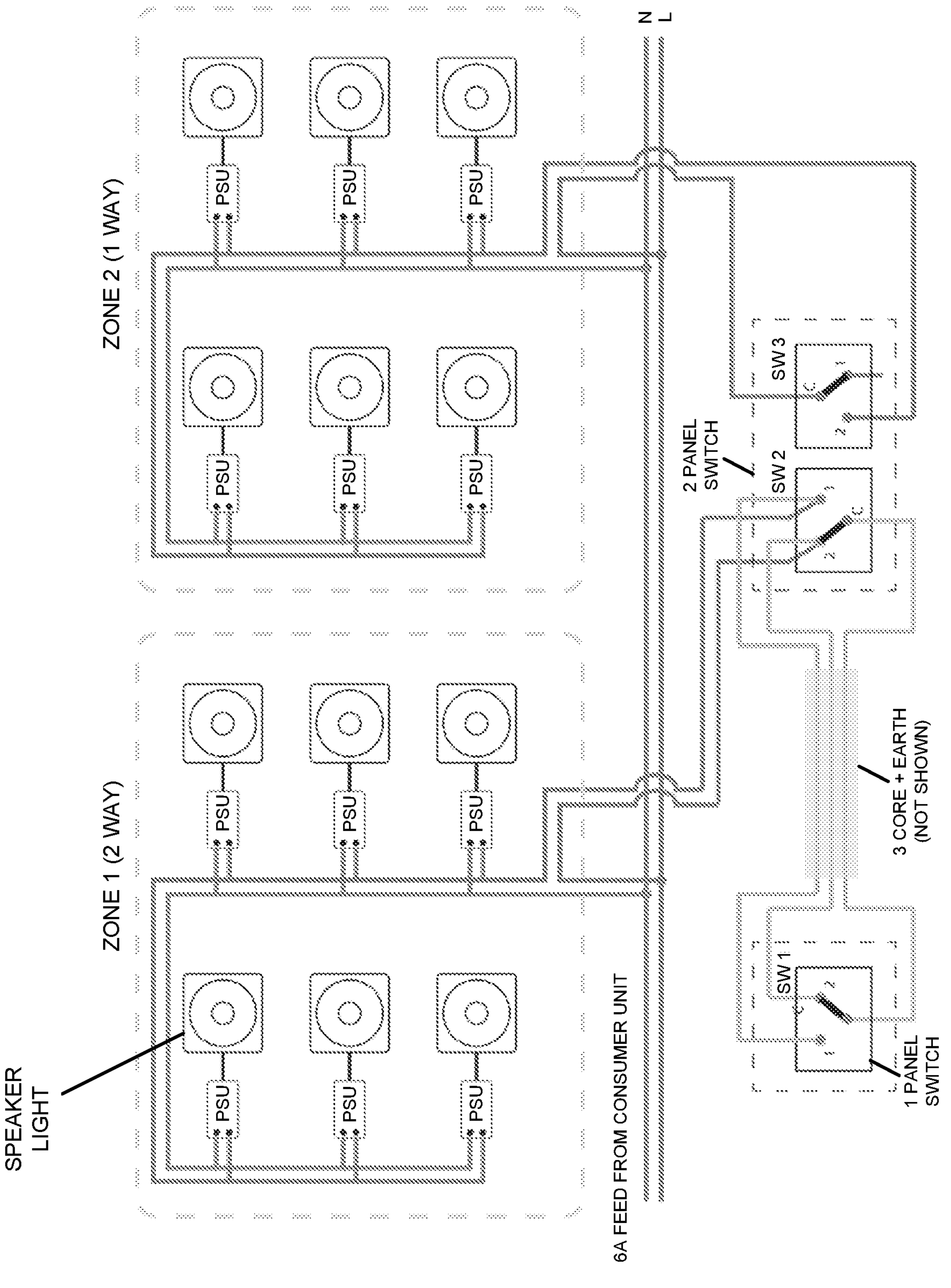
FIG. 14 is a drawing illustrating an example of a switching configuration in accordance with an embodiment of the present disclosure.
Figure 15:
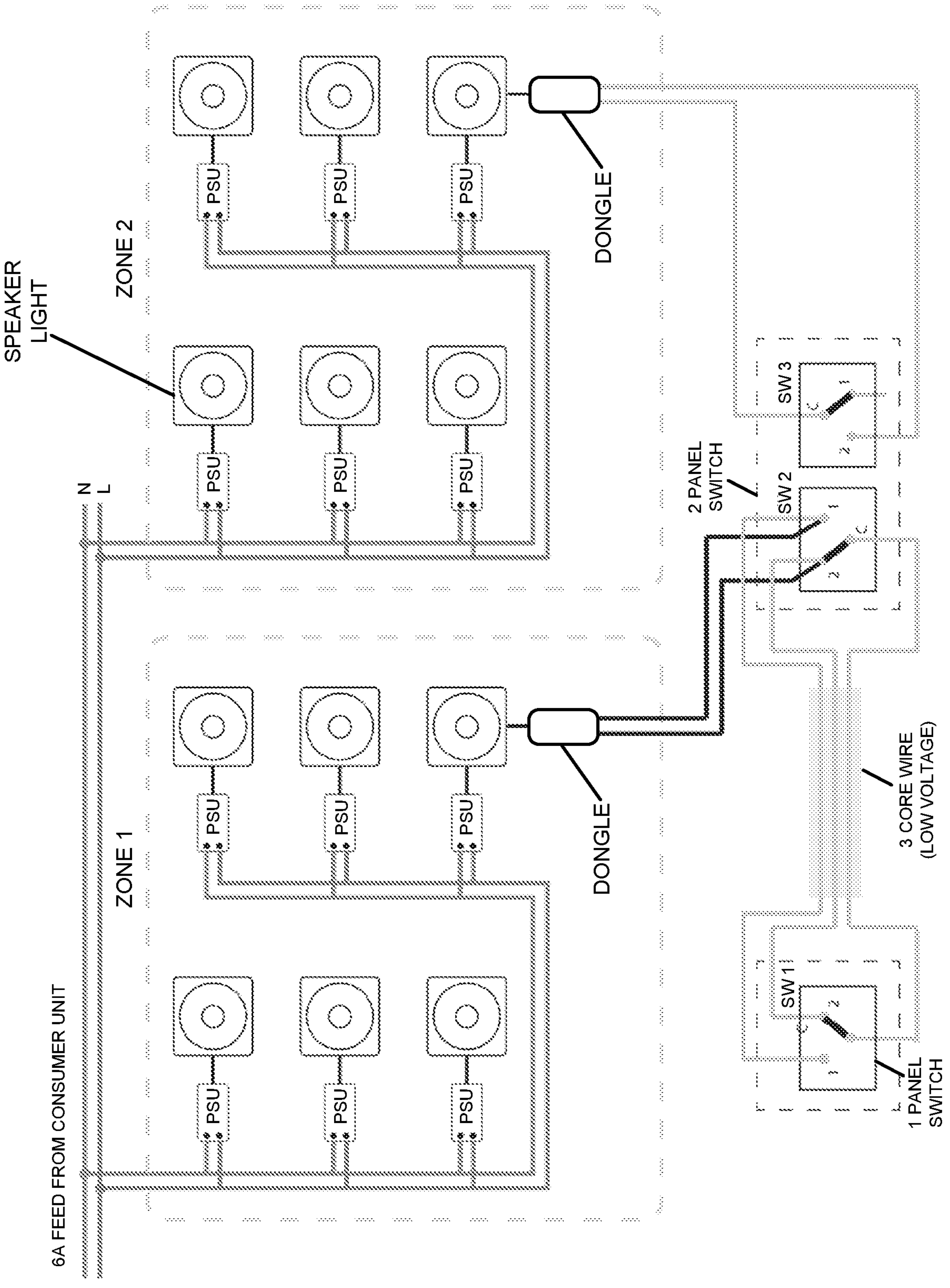
FIG. 15 is a drawing illustrating an example of a switching configuration in accordance with an embodiment of the present disclosure.

As shown in FIG. 13, which presents an example of a switching configuration, in some embodiments of the disclosed configuration techniques the one or more speaker lights (illustrated by the rectangles surrounding the circles), which are powered by power-supply units (PSUs), are electrically coupled to one or more light switches (e.g., SW1, SW2 and/or SW3) by wires using one or more relays, such as a Shelly 1L relay (from Shelly, Inc. of Las Vegas, Nevada), which may provide hybrid functionality. Alternatively, as shown in FIGS. 14 and 15, which present examples of switching configurations, in some embodiments of the disclosed configuration techniques the one or more speaker lights are electrically coupled to one or more light switches (e.g., SW1, SW2 and/or SW3) by wires without using a relay. Note that the configuration shown in FIG. 14 may be typical in the United Kingdom. In FIGS. 14 and 15, the light switch turns the power to the speaker lights on/off. A microcontroller may boot a speaker light in less than, e.g., 1 s, so that the light(s) may turn on as soon as power is present. However, the power-on behavior of the speaker-light array may be configured or set using the application. Moreover, as shown in FIG. 15, in some embodiments at least one of the speaker lights may be electrically coupled to one or more light switches via a dongle, whose functionality is described further below. These approaches may address the resistance of many home builders and commercial developers to adopt the aforementioned existing approaches. Notably, these home builders and commercial developers are reluctant to use complicated solutions, especially when they are network dependent. Consequently in order for typical home builders and commercial developers to consider using a smart lighting solution, a functional or conventional light switch is required.

Notably, in the disclosed configuration techniques, a switch-wiring architecture that is familiar to installers is used. Moreover, in order to avoid the use of wireless communication to detect a switch sate, a speaker light (such as the master speaker light) may detect the switch state. In some embodiments, a dongle or an accessory may be plugged into the speaker light (e.g., into a USB port). (However, in other embodiments, the functionality of the dongle may be included in the speaker light.) While the dongle may be connected to the speaker light via a USB port, it may not use a USB communication protocol. Thus, the pins in a USB socket may be used for different dedicated functions than in a USB communication protocol. As discussed further below, the dongle may have an Ethernet connection as alternative way to connect the speaker light to a network. The dongle may include a microcontroller. Moreover, the electrical terminals in the dongle may receive wires from both ends of the light switch. One of the ends of the light switch may be pulled up to logic level 'high' or down to logic level 'low' (e.g., via a step-up/step-down converter to enable the switch level to be at, e.g., 24 V, to compensate for voltage drop along the length of the wires). Furthermore, when the light switch is opened or closed, this may invert a state of the pin that the microcontroller is watching. The microcontroller in the dongle may then send a message via serial command (although a different communication technique may be used) to a microcontroller inside the speaker light, which controls the light(s). For example, the command may be to invert the state of the light(s), such as to toggle.

Figure 16:
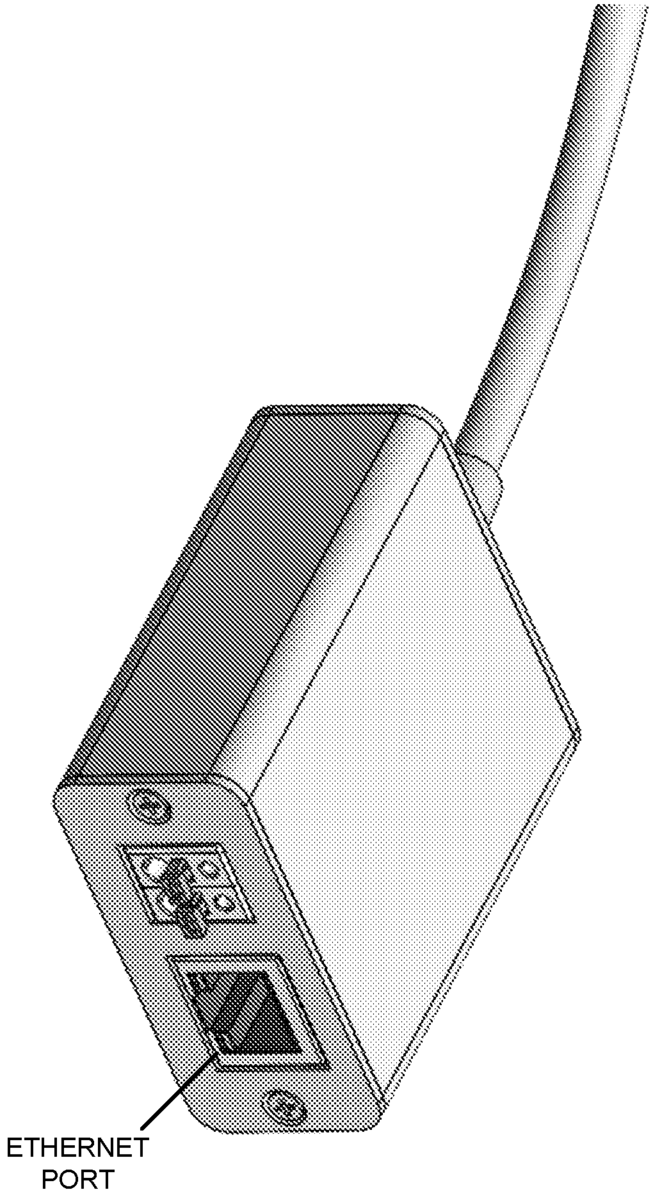
FIG. 16 is a drawing illustrating an example of a dongle in accordance with an embodiment of the present disclosure.

Thus, the dongle may allow the microcontroller in the speaker light to detect the switch state via wires that are electrically coupled to a light switch. Stated differently, the light switch may be electrically coupled to the speaker light, which uses a microcontroller as interpreter. In these embodiments, there is no supplementary configuration or pairing needed. Moreover, by avoiding the use of wireless communication with the light switch, radio-frequency shielding associated with metal covers may not be a problem. As shown in FIG. 16, which presents an example of a dongle, in some embodiments a given dongle or a given speaker light may also be electrically coupled to an Ethernet socket, which may provide an alternate way to communicate with and control and configure the given speaker light.

In some embodiments, when the master speaker light detects that the state of a light switch has changed to 'off', the master speaker light may act as a hub and may wirelessly instruct the remainder of the speaker-light array to stop playing music or outputting sound and/or to stop providing illumination or light in the environment. Moreover, the master speaker light may also transition to a lower-power operating state. Alternatively, when the state of the light switch is changed to 'on,' the master speaker light may transition to a higher-power operating state. Furthermore, the master speaker light may wirelessly instruct the remainder of the speaker-light array to resume playing music or outputting sound and/or to provide illumination or light in the environment. In some embodiments, the light or power switch may be electrically coupled by wires to one or more different speaker lights (as opposed to electrically coupling to the master speaker light), and the control of the speaker lights may be local and/or distributed throughout the speaker-light array (as opposed to by the master speaker light). For example, while the master speaker light may wirelessly receive control signals and may distribute audio to the remaining speaker lights, any of the speaker lights with a dongle may be become the 'master' for receiving and propagating changes to a switch state from a light switch to some or all of the remaining speaker lights. Note that the preceding embodiments may be extended to include detecting or determining a larger number of states than binary (e.g., other than on or off, such as when the power switch includes a slider or a rotary switch) or detecting or determining a continuous-valued state (such as when the light switch is a dimmer switch instead of a mechanical toggle switch).

While the preceding discussion illustrated interaction with the user interface as involving physical contact with a touch-sensitive display, in other embodiments there may not be physical contact. For example, using remote object tracking (such as ultrasound, radar, image analysis, etc.), the locations of one or more fingers of a user may be tracked (even when there is no physical contact with a touch-sensitive display). Thus, the user may use a hand or finger gesture to modify a state of a given user-interface object. Alternatively or additionally, a gaze direction or expression of the user may be tracked.

In some embodiments of the configuration techniques, there may be additional or fewer operations. Furthermore, the order of the operations may be changed, and/or two or more operations may be combined into a single operation.

Moreover, in some embodiments, the user interfaces may include fewer or additional user-interface features (such as user-interface icons), positions(s) or one or more user-interface features may be changed, two or more user-interface features may be combined into a single user-interface feature, and/or a single user-interface feature may be divided or separated into two or more user-interface features.

Figure 17:
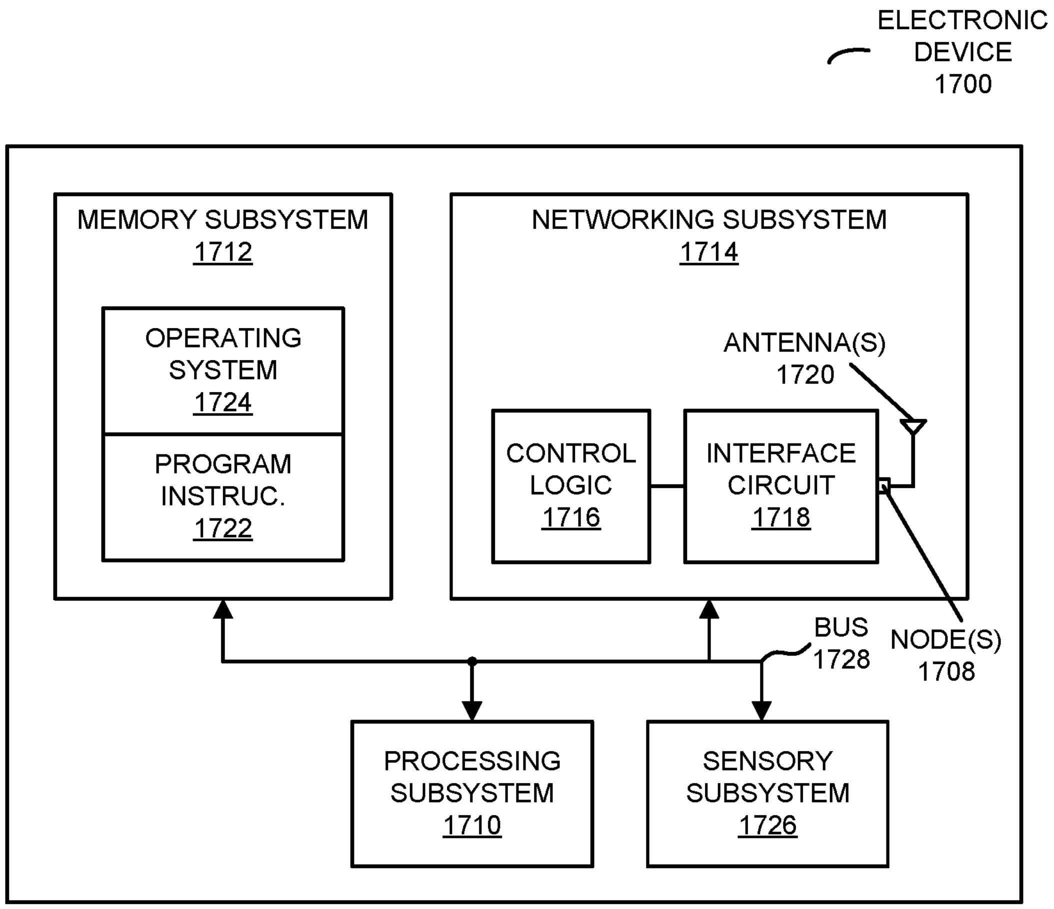
FIG. 17 is a block diagram illustrating an example of an electronic device in accordance with an embodiment of the present disclosure.

We now describe embodiments of an electronic device, which may perform at least some of the operations in the configuration techniques. FIG. 17 presents a block diagram illustrating an example of an electronic device 1700 in accordance with some embodiments. This electronic device may include processing subsystem 1710, memory subsystem 1712, and networking subsystem 1714. Processing subsystem 1710 includes one or more devices configured to perform computational operations. For example, processing subsystem 1710 can include one or more microprocessors, ASICs, microcontrollers, programmable-logic devices, graphical processing units (GPUs) and/or one or more digital signal processors (DSPs).

Memory subsystem 1712 includes one or more devices for storing data and/or instructions for processing subsystem 1710 and networking subsystem 1714. For example, memory subsystem 1712 can include dynamic random access memory (DRAM), static random access memory (SRAM), and/or other types of memory. In some embodiments, instructions for processing subsystem 1710 in memory subsystem 1712 include: program instructions or sets of instructions (such as program instructions 1722 or operating system 1724), which may be executed by processing subsystem 1710. Note that the one or more computer programs or program instructions may constitute a computer-program mechanism. Moreover, instructions in the various program instructions in memory subsystem 1712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1710.

In addition, memory subsystem 1712 can include mechanisms for controlling access to the memory. In some embodiments, memory subsystem 1712 includes a memory hierarchy that comprises one or more caches coupled to a memory in electronic device 1700. In some of these embodiments, one or more of the caches is located in processing subsystem 1710.

In some embodiments, memory subsystem 1712 is coupled to one or more high-capacity mass-storage devices (not shown). For example, memory subsystem 1712 can be coupled to a magnetic or optical drive, a solid-state drive, or another type of mass-storage device. In these embodiments, memory subsystem 1712 can be used by electronic device 1700 as fast-access storage for often-used data, while the mass-storage device is used to store less frequently used data.

Networking subsystem 1714 includes one or more devices configured to couple to and communicate on a wired and/or wireless network (i.e., to perform network operations), including: control logic 1716, an interface circuit 1718 and one or more antennas 1720 (or antenna elements). (While FIG. 17 includes one or more antennas 1720, in some embodiments electronic device 1700 includes one or more nodes, such as nodes 1708, e.g., a connector or a pad, which can be coupled to the one or more antennas 1720. Thus, electronic device 1700 may or may not include the one or more antennas 1720. Note that the one or more nodes 1708 may constitute input(s) to and/or output(s) from electronic device 1700. In some embodiments, the one or more nodes 1708 are configured to electrically couple to one or more wires, such as a wired connection or link.) For example, networking subsystem 1714 can include a Bluetooth™ networking system, a cellular networking system (e.g., a 3G/4G network such as UMTS, LTE, etc.), a USB networking system, a networking system based on the standards described in IEEE 802.11 (e.g., a Wi-Fi® networking system), an Ethernet networking system, and/or another networking system.

Networking subsystem 1714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1700 may use the mechanisms in networking subsystem 1714 for performing simple wireless communication between the electronic devices, e.g., transmitting advertising or beacon frames and/or scanning for advertising frames transmitted by other electronic devices as described previously.

Within electronic device 1700, processing subsystem 1710, memory subsystem 1712, and networking subsystem 1714 are coupled together using bus 1728. Bus 1728 may include an electrical, optical, and/or electro-optical connection that the subsystems can use to communicate commands and data among one another. Although only one bus 1728 is shown for clarity, different embodiments can include a different number or configuration of electrical, optical, and/or electro-optical connections among the subsystems.

In some embodiments, electronic device 1700 includes a sensory subsystem 1726 for outputting sound and/or light. In some embodiments, sensory subsystem 1726 may display information on a display, which may include a display driver and the display, such as a liquid-crystal display, a multi-touch touchscreen, etc.

Electronic device 1700 can be (or can be included in) any electronic device with at least one network interface. For example, electronic device 1700 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device.

Although specific components are used to describe electronic device 1700, in alternative embodiments, different components and/or subsystems may be present in electronic device 1700. For example, electronic device 1700 may include one or more additional processing subsystems, memory subsystems, networking subsystems, and/or display subsystems. Additionally, one or more of the subsystems may not be present in electronic device 1700. Moreover, in some embodiments, electronic device 1700 may include one or more additional subsystems that are not shown in FIG. 17. Also, although separate subsystems are shown in FIG. 17, in some embodiments some or all of a given subsystem or component can be integrated into one or more of the other subsystems or component(s) in electronic device 1700. For example, in some embodiments program instructions 1722 are included in operating system 1724 and/or control logic 1716 is included in interface circuit 1718.

Moreover, the circuits and components in electronic device 1700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1714 or of electronic device 1700. The integrated circuit may include hardware and/or software mechanisms that are used for transmitting wireless signals from electronic device 1700 and receiving signals at electronic device 1700 from other electronic devices. Aside from the mechanisms herein described, radios are generally known in the art and hence are not described in detail. In general, networking subsystem 1714 and/or the integrated circuit can include any number of radios. Note that the radios in multiple-radio embodiments function in a similar way to the described single-radio embodiments.

In some embodiments, networking subsystem 1714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on Those of skill in the art of integrated circuit the computer-readable medium, fabrication can use such encoded data to fabricate integrated circuits that include one or more of the circuits described herein.

While the preceding discussion used an Ethernet, a cellular-telephone communication protocol and/or a Wi-Fi communication protocol as an illustrative example, in other embodiments a wide variety of communication protocols and, more generally, wireless communication techniques may be used. For example, the communication protocol in a WLAN may use OFDMA. Thus, the configuration techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the configuration techniques may be implemented using program instructions 1722, operating system 1724 (such as a driver for interface circuit 1718) or in firmware in interface circuit 1718. Thus, the configuration techniques may be implemented at runtime of program instructions 1722. Alternatively or additionally, at least some of the operations in the configuration techniques may be implemented in a physical layer, such as hardware in interface circuit 1718.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A system, comprising:

a speaker light;

a power supply, electrically coupled to the speaker light, configured to provide electrical power to the speaker light when the power supply is electrically coupled to an external power source;

a relay electrically coupled to the power supply and electrically coupled to a switch; and the switch, wherein the switch has a first state in which the switch electrically couples the relay to the external power source and a second state in which the switch electrically decouples the relay from the external power source, and wherein the switch has more states than the first state and the second state.

2. The system of claim 1, wherein the external power source comprises utility power.

3. The system of claim 1, wherein the switch comprises a toggle switch.

4. The system of claim 1, wherein the speaker light comprises a master speaker light in a speaker-light array with multiple speaker lights and associated power supplies that are electrically coupled to the speaker lights; and wherein the master speaker light is configured to configure and control operation of the speaker lights using wireless communication.

5. The system of claim 1, wherein the system comprises:

a speaker-light array with multiple speaker lights and the speaker light comprises a master speaker light in the speaker-light array; and power supplies that are electrically coupled to the speaker lights and the relay, wherein a given power supply in the power supplies is electrically coupled to a given speaker light in the speaker lights.

6. The system of claim 5, wherein the speaker lights are electrically coupled in parallel with the relay.

7. The system of claim 1, wherein the speaker light is configured to transition to a first operating state when the switch is in the first state and to transition to a second operating state when the switch is in the second state; and wherein a power consumption of the speaker light in the first operating state is less than a power consumption of the speaker light in the second operating state.

8. The system of claim 1, wherein a transition time from the first operating state to the second operating state is based at least in part on a predefined configuration of the speaker light.

9. The system of claim 1, wherein the system comprises a dongle that is electrically coupled to a port in the speaker light and the speaker light is electrically coupled to the relay via the dongle.

10. The system of claim 9, wherein the dongle is configured to provide compatibility with a communication protocol that is otherwise not supported by the speaker light.

11. The system of claim 10, wherein the communication protocol is compatible with an Institute of Electrical and Electronics Engineers (IEEE) 802.3 communication protocol or a Message Queueing Telemetry Transport (MQTT) communication protocol.

12. The system of claim 9, wherein the port comprises a universal serial (USB) port.

13. The system of claim 12, wherein pins in the USB port are configured to be used for different functions than UCB communication.

14. The system of claim 9, wherein the dongle is electrically coupled to both electrical connections of the switch; and wherein the dongle is configured to pull one of the electrical connections up to a first logic level or down to a second logic level.

15. The system of claim 14, wherein the dongle comprises a set-up/step-down converter configured to compensate for a voltage drop between the switch and the dongle.

16. The system of claim 14, wherein, when the switch is transitioned from the first state to the second state, a state of the one of the electrical connections is inverted;

wherein, based at least in part on the inversion, the dongle is configured to provide a message to the speaker light to transition from a second operating state to a first operating state; and wherein a power consumption of the speaker light in the first operating state is less than a power consumption of the speaker light in the second operating state.

17. The system of claim 1, wherein the switch has a continuous-valued state, which comprises the first state and the second state.

18. A speaker light, comprising:

an interface circuit configured to electrically couple to an electronic device, which is electrically coupled to a switch that selectively electrically couples the electronic device to an external power source;

memory storing program instructions; and a processor electrically coupled to the interface circuit and the memory, wherein, when executed by the processor, the program instructions cause the speaker light to perform operations comprising:

when the electronic device is electrically coupled to the external power source, transitioning the speaker light from a first operating state to a second operating state, wherein a power consumption in the first operating state is less than a power consumption in the second operating state; and when the electronic device is electrically decoupled from the external power source, transitioning the speaker light from the second operating state to the first operating state.

19. A method for operating a speaker light, comprising:

by the speaker light:

when an electronic device, which is electrically coupled to the speaker light and a switch that selectively electrically couples the electronic device to an external power source, is electrically coupled to the external power source, transitioning the speaker light from a first operating state to a second operating state, wherein a power consumption in the first operating state is less than a power consumption in the second operating state; and when the electronic device is electrically decoupled from the external power source, transitioning the speaker light from the second operating state to the first operating state.

20. The method of claim 19, wherein the switch has more states than the first state and the second state.

* * * * *